United States Patent [19]
Berg

[11] Patent Number: 5,397,080
[45] Date of Patent: Mar. 14, 1995

[54] DEVICE FOR RETARDING THE SPREAD OF A FIRE INTO AN AIRCRAFT CABIN

[75] Inventor: Hans D. Berg, Ritterhude, Germany

[73] Assignee: Deutsche Aerospace Airbus GmbH, Hamburg, Germany

[21] Appl. No.: 115,444

[22] Filed: Sep. 1, 1993

[30] Foreign Application Priority Data

Sep. 1, 1992 [DE] Germany .................. 42 29 158.5

[51] Int. Cl.⁶ ............................................. B64C 1/14
[52] U.S. Cl. ........................... 244/129.2; 244/129.3; 169/48; 160/37; 160/1; 160/104; 160/201
[58] Field of Search ............ 244/129.2, 129.3; 160/1, 7, 9, DIG. 7, 37, 104, 201; 49/378; 169/48, 56, 57

[56] References Cited

U.S. PATENT DOCUMENTS

| | | | |
|---|---|---|---|
| 3,336,153 | 8/1967 | Juda | 169/48 |
| 3,691,686 | 9/1972 | Donegan | 244/129.3 |
| 3,906,669 | 9/1975 | Vorguitch | 244/129.3 |
| 4,213,227 | 7/1980 | McCabe | 160/1 |

FOREIGN PATENT DOCUMENTS

| | | | |
|---|---|---|---|
| 0273220 | 7/1988 | European Pat. Off. | 244/129.3 |
| 2668708 | 5/1992 | France | 169/48 |
| 2160791 | 1/1986 | United Kingdom | 169/48 |

Primary Examiner—Michael S. Huppert
Assistant Examiner—Anne E. Bidwell
Attorney, Agent, or Firm—W. G. Fasse; W. F. Fasse

[57] ABSTRACT

The spreading of a fire outside of an aircraft body into the cabin through the windows is retarded by a fire retardant slide member that is movable into a window covering position guided by guide rails or the like. Both, the sliding member and the guide rails are made of fire retarding material such as thermosetting material, preferably glass fiber reinforced thermosetting materials. A thermoplastic locking element that holds the sliding cover member in a recessed position releases the cover member when the locking element melts at elevated temperatures to cover the window automatically, e.g. with the aid of gravity or with the aid of one or more biasing springs.

20 Claims, 6 Drawing Sheets

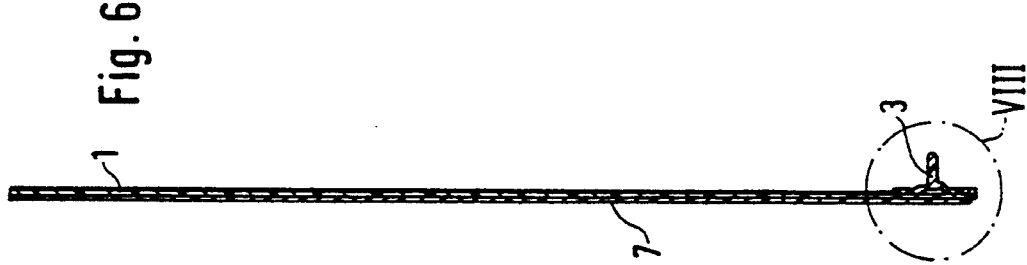
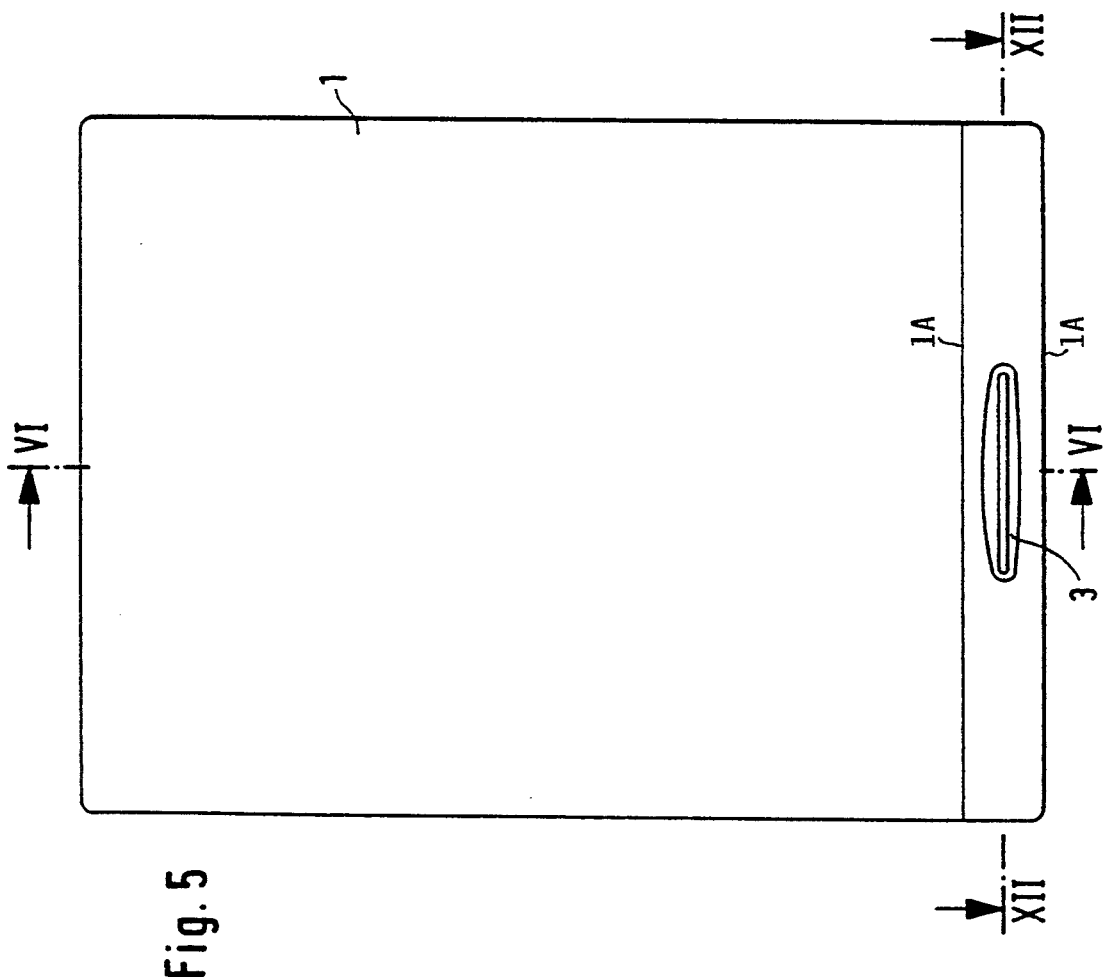

DEVICE FOR RETARDING THE SPREAD OF A FIRE INTO AN AIRCRAFT CABIN

FIELD OF THE INVENTION

The invention relates to a device for retarding the spread of a fire into an aircraft cabin, for example, after a crash when a fuel fire has started outside the aircraft body.

BACKGROUND INFORMATION

Continuous efforts are being made to increase the safety of the passengers in an aircraft when a fire should start. Especially after a forced landing, there is a substantial fire danger caused by aircraft fuel flowing out of broken fuel lines or tanks. If an aircraft stands or lies with its body in a burning pool of aircraft fuel, it takes conventionally less than a minute for the outer skin of the aircraft to burn through at least at the most exposed points. Thus, it is necessary that the interior wall of the aircraft body that encloses the cabin must retard the fire at least as long as it takes for the passengers to leave the aircraft. It has been found that in a fire situation as just described the windows and the areas around the windows in the cabin walls are weak points which do not retard the fire as long as is necessary for the above purpose. The window panes are conventionally made of synthetic material that has hardly any fire retarding ability.

OBJECTS OF THE INVENTION

In view of the foregoing it is the aim of the invention to achieve the following objects singly or in combination:

- to construct especially the window areas of an aircraft body in such a way that a fire retarding will be assured for a duration at least sufficient for the passengers to leave the aircraft;
- to altogether increase the fire retarding ability of an aircraft body by simple means which nevertheless assure the desired reduction in the danger to the passengers by retarding an external fire from its entry through the aircraft body into the aircraft cabin;
- to assure either a manual or automatic covering of the window areas in an aircraft body for fire retarding purposes in case of an emergency; and
- to utilize the rising temperatures for causing an automatic covering of the window areas in an aircraft body.

SUMMARY OF THE INVENTION

The above objects have been achieved by the combination of the following features according to the invention. A window covering slide member made of fire retardant material is arranged in the area of a cabin window. Guide elements, such as guide rails, are arranged in the window area to guide the slide member from a removed position outside the window area into a window covering position. This movement of the slide member may be accomplished either manually or automatically in response to the rising heat. The guide elements are also made of fire retardant material. This construction according to the invention either prevents the entry of a fire into the interior of the aircraft cabin or at least delays such entry. The fire retardant slide member may be arranged on the outside window panes or on the inside of the window panes which are usually constructed as double window panes. The outside arrangement directly protects the window panes. The inside arrangement of the slide member still protects against the entry of fire and/or smoke even if the window panes are damaged. By constructing the guide elements such as guide rails of fire retardant material it is assured that the movability of the slide member is maintained even when there is an outside fire so that the slide member may be moved into a position closing or completely covering the window opening. By making both the slide member and its guide elements of fire retarding material a sufficient seal is provided relative to the aircraft body wall along the edges of the slide member to prevent even smoke from entering into the cabin.

The structure of the covering slide member or slider is especially light, yet stable if the slider is made of thermosetting materials in a layered structure, especially a sandwich structure in which two outer cover layers of fire retarding materials enclose an inner lightweight honeycomb core, also of fire retarding materials. The outer cover layers are, for example, made of a glass fiber reinforced phenolic resin and the honeycomb core is made of a similar material with core elements having a hexagonal cross-section.

It is especially important that the slider according to the invention does not burn through and such a structure may also be accomplished in that the slider is provided with a fire retardant coating, preferably facing toward the outside of the aircraft. The coating is preferably made of an intumescent material which develops a fire retardant foam when a certain threshold temperature is exceeded to which the intumescent material is exposed.

The guide elements, such as guide rails, are preferably made of a glass fiber reinforced thermosetting material, preferably the same material as the slider, whereby a sufficient movability of the slider in case of a fire is assured.

An automatic closing of the slider or rather an automatic movement of the slider into the window covering position is provided in that the slider is equipped with an automatic release element, such as a locking element made of a thermoplastic material that melts and thereby releases the movement of the slider into its covering position, either by gravity or in response to an expanding biasing spring or the like. This construction is especially simple, price efficient, and yet reliable. The thermoplastic material of the locking element should soften at a temperature of about 150° to 200° C. The locking element may also be glass fiber reinforced with the glass fibers embedded in a thermoplastic material.

It faciliates the installation of the slider if the slider is made at least partially as a member that is elastic against bending loads.

In its simplest embodiment the slider may be provided with a handle to be manually pushed into a covering position when needed. When the slider is made of an opaque material it may normally be used as a light excluding window screen.

BRIEF DESCRIPTION OF THE DRAWINGS

In order that the invention may be clearly understood, it will now be described, by way of example, with reference to the accompanying drawings, wherein:

FIG. 5 is a plan view of one embodiment of the present slide member;

FIG. 6 is a sectional view along section line VI—VI in FIG. 5;

DETAILED DESCRIPTION OF PREFERRED EXAMPLE EMBODIMENTS AND OF THE BEST MODE OF THE INVENTION

Figure 1:
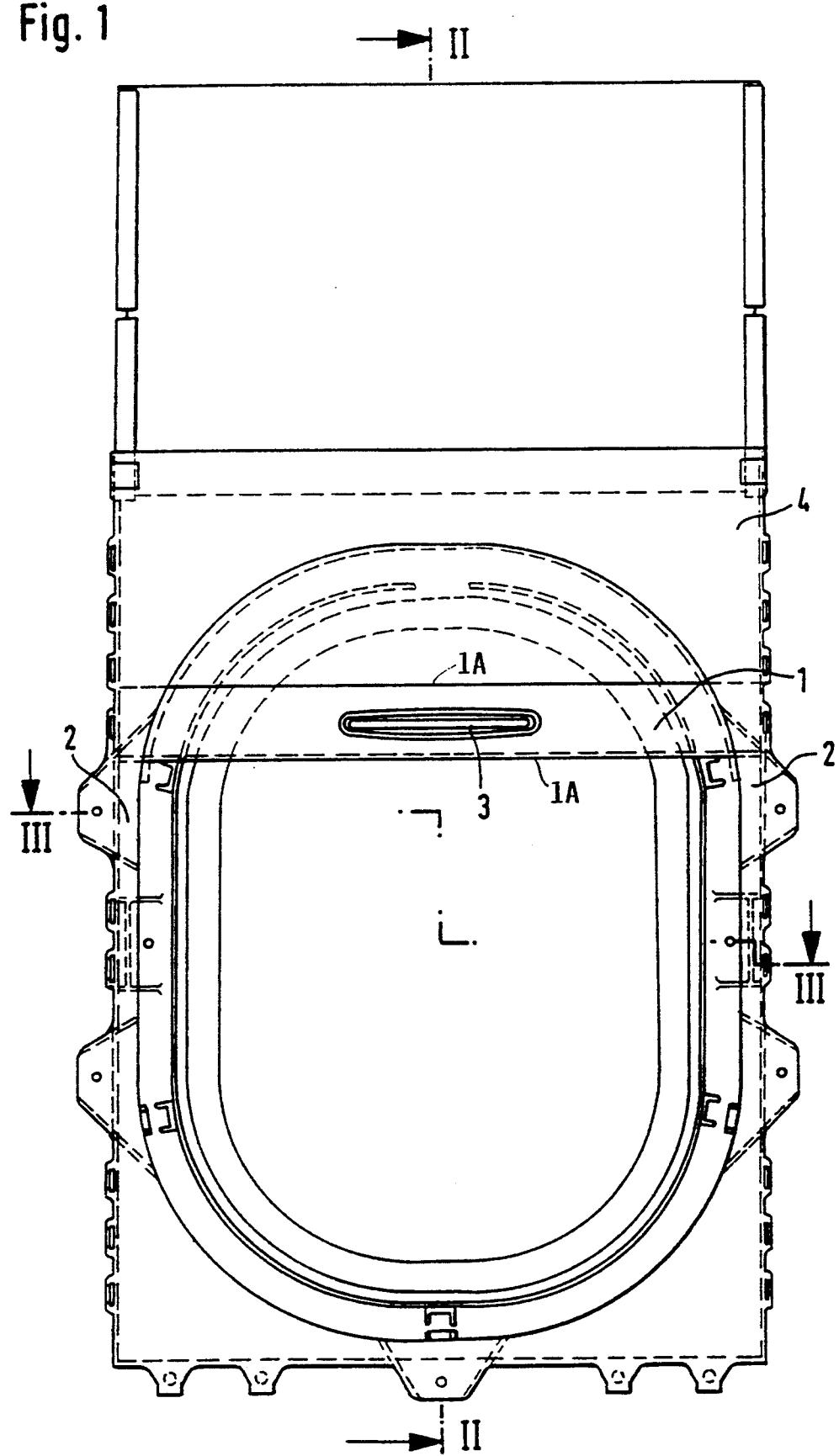
FIG. 1 is a plan view of an aircraft window equipped according to the invention with a fire retarding slide member shown in a substantially recessed position permitting viewing through the window.
Figure 2:
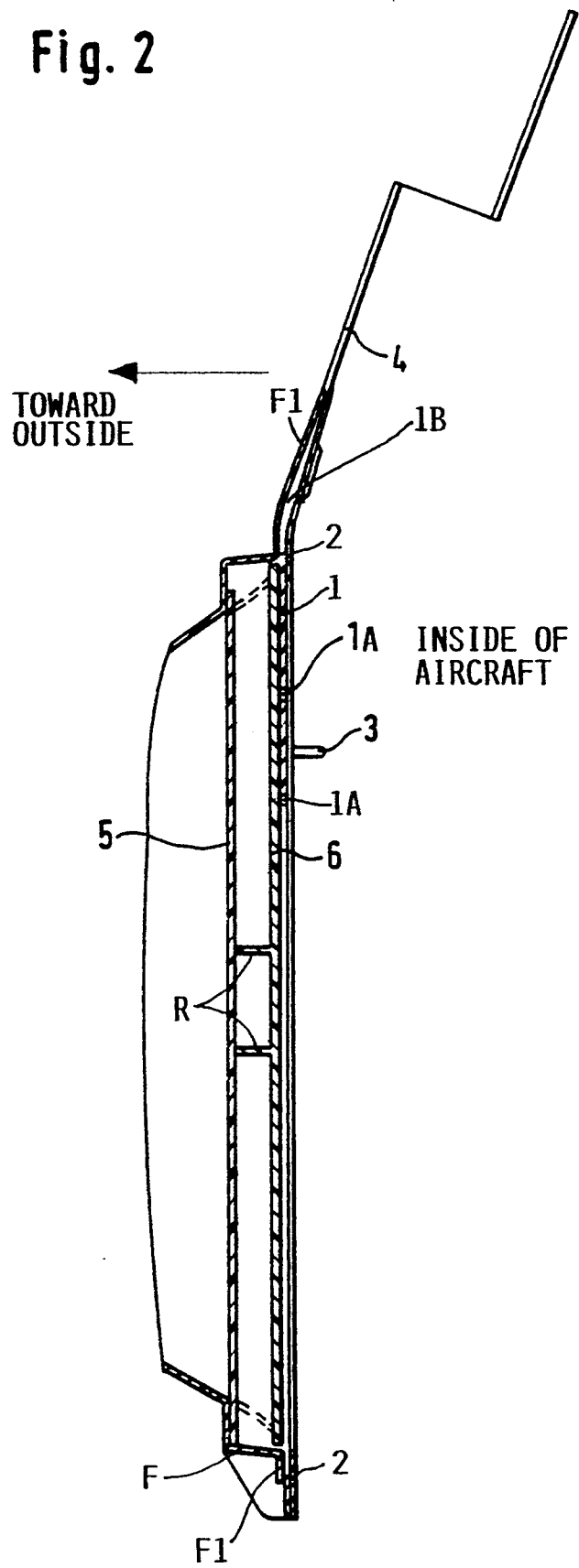
FIG. 2 is a sectional view along section line II—II in FIG. 1 without showing the outside wall surface of the aircraft body with the slide member still in the recessed position.

FIGS. 1 and 2 viewed in conjunction show an aircraft window construction in which a window covering slide member 1 is made, according to the invention, of a fire retardant material. The aircraft outer wall is not shown and the aircraft inner wall 4 is only shown schematically. A window frame F passes through an opening in the aircraft body and its flanges F1 are secured to the inner cabin wall 4. The frame F holds double window panes 5 and 6 of transparent material. The panes 5 and 6 are spaced from one another and, if desired, may be reinforced by ribs R shown in FIG. 1 which are also fully transparent. The window covering fire retarding slide member 1 is shown in its substantially recessed position, whereby it only covers an upper small portion of the window as best seen in FIG. 1 so that a handle 3 secured to cross ribs 1A of the slide member 1 is accessible. A pocket 1B is formed in the inner cabin wall 4 so that the slide member may be kept recessed, except in an emergency or when it is desired to screen out light. In that case, the slide member 1 will be made of a material that is fire retardant and opaque. Further, the slide member 1 is guided in its up and down movement by at least two guide rails 2 arranged laterally and vertically alongside the window frame F. Thus, the slide member 1 is guided in its movement between the recessed or removed position and the window covering position by the guide rails 2. Preferably, the sliding member 1 is made of a bendable flexible material so that it may be recessed into the pocket 1D having a configuration that conforms to the curvature or contour of the cabin wall 4. The sliding member 1 with its handle 3 and the guide rails 2 are made, as mentioned, according to the invention, of fire retardant material, preferably of the same materials, whereby a continued sliding movement is possible even at higher temperatures.

Figure 3:
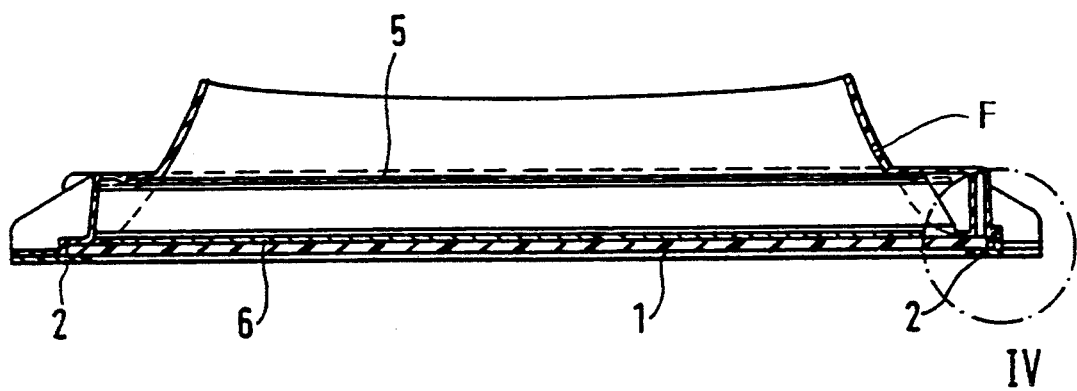
FIG. 3 is a horizontal cross-section along section line III—III in FIG. 1, but showing the slide member 1 in the window covering position.
Figure 4:
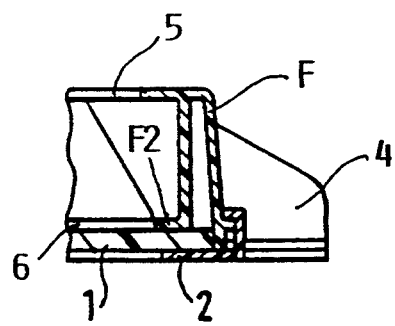
FIG. 4 is a sectional view of an enlarged portion IV in FIG. 3.

FIGS. 3 and 4 show the sliding member in the window covering position. Additionally, FIG. 4 shows that the window frame F has an inner frame section F2 that cooperates with the guide rail 2 to guide the slide member on both of its surfaces along the edges of the slide member 1. Thus, a proper guiding of the slide member 1 is assured at all times, unless the particular window frame is bent out of shape by a crash.

FIG. 5 shows a one piece integral construction of the slide member 1 with its handle 3 and its reinforcing bottom ribs 1A. FIG. 6 shows the slide member 1 as a two layer construction in which the outwardly facing surface of the slide member 1 has bonded thereto an intumescent layer 7 of a material that is fire retardant and will form a fire retarding foam when exposed to sufficiently high temperatures. For example, polyurethane base coatings are suitable for this purpose. Layer 7 will face outwardly.

The material should be so selected that it will respond with its foaming reaction to temperatures that are typical when a fire starts at a crash site. Response temperatures should be about 150° C. to 200° C.

Figure 7:
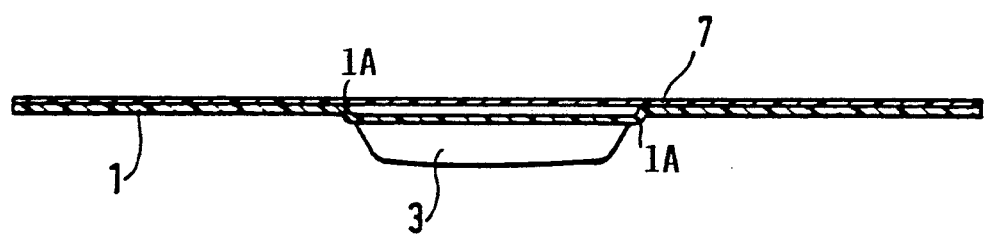
FIG. 7 is a sectional view along section line VII—VII in FIG. 5.

FIG. 7 shows the handle construction, whereby the handle 3 forms part of the slide member 1 and the intumescent coating 7 is applied to the slide member 1 on the opposite side of the handle 3, whereby the reinforcing ribs 1A may space the handle 3 slightly out of the plane defined by the slide member 1.

Figure 8:
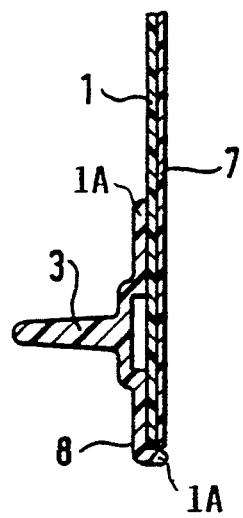
FIG. 8 is a sectional view showing on an enlarged scale the detail VIII in FIG. 6, illustrating a handle construction.

FIG. 8 shows that the handle 3 has a body 8 forming the reinforcing ribs 1A extending preferably substantially over the entire width of the slide member 1.

Figure 9:
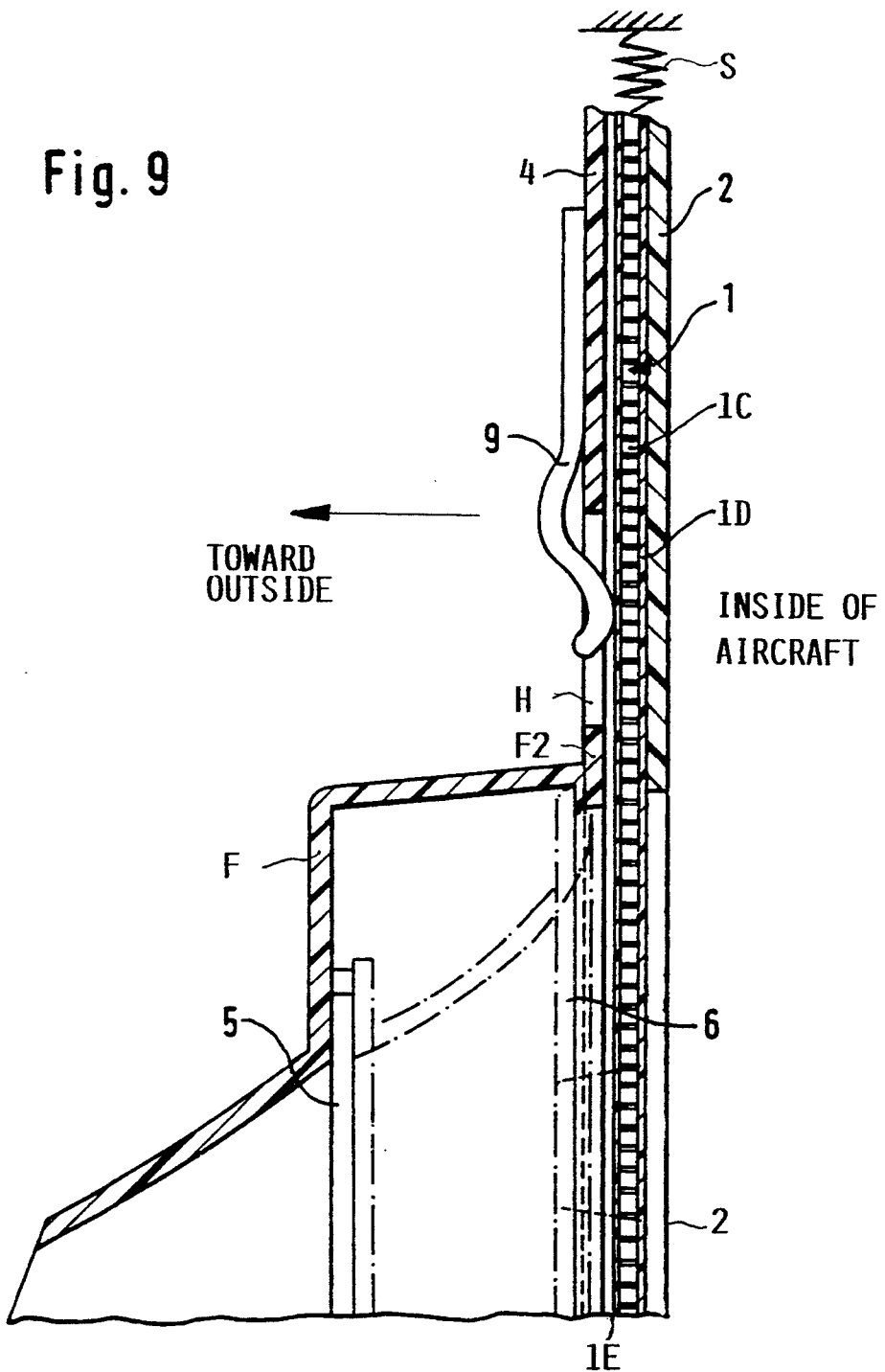
FIG. 9 is an enlarged sectional view through another embodiment of a slide member according to the invention constructed as a sandwich structure held in place in a recess in the inner aircraft cabin wall by a thermoplastic locking element that normally holds the slide member in a recessed position but will release the slide member in response to a temperature that will soften the locking element.

FIG. 9 shows an embodiment in which the slide member 1 is constructed as a honeycomb sandwich structure with a honeycomb core 1C covered by two outer layers 1D and 1E. The fire retarding slide member 1 is shown in a position in which the slide member 1 covers the window panes 5 and 6. The slide member 1 is guided by the elements 2 and F2, whereby F2 forms part of the window frame secured to the inner cabin wall 4. A locking element 9 normally holds the slide member 1 in its upper window uncovering position. The locking element 9 is made of thermoplastic material, preferably glass fiber reinforced thermoplastic material that at normal operating temperatures bears elastically as a spring against the slide member 1. The elastic spring force of the locking element 9 under normal operating temperatures, e.g. room temperature, is sufficient to hold the slide member 1 in the window uncovering position. However, when a sufficiently high temperature occurs, the locking element 9 of the thermoplastic material softens, thereby losing its spring elastic force, whereby gravity causes the slide member 1 to slide down into the window covering position shown in FIG. 9. If desired, a spring S may bias the slide member 1 downwardly into a window covering position. In that case, the locking element 9 preferably has an S shape and may engage a notch or depression in the slide member 1 through a hole H for holding the slide member 1 in its recessed position against the force of gravity and, if a spring S is used, also against the force of the spring S which is only shown symbolically in FIG. 9. Two springs S may, for example, be connected to the side edges of the slide member 1 and to a fixed point in the wall 4 for biasing the slide member 1 into a window covering position. However, the holding spring force of the locking element 9 may be overcome manually by pushing down on the handle 3, not shown in FIG. 9, e.g. when the slide member 1 also functions as an opaque window cover. Such normal manual operation does not interfere with the automatic closure in response to heat that softens the locking element 9.

Different materials may be selected for making the slide member 1 temperature resistant thermosetting materials preferably glass fiber reinforced have been found to be suitable for the present purposes. The honeycomb structure of the slide member 1C, 1D, 1E in FIG. 9 also has an improved fire retarding characteristic. The cover layers 1D and 1E may, for example, be made of a thermosetting resin such as a phenolic resin fiber reinforced, and the honeycomb core is preferably made of the same materials. The core elements have preferably a hexagonal cross-section. The locking element 9 is preferably made of a thermoplastic material that softens at a temperature within the range of about 150° to 200° C.

Although the invention has been described with reference to specific example embodiments, it will be appreciated that it is intended to cover all modifications and equivalents within the scope of the appended claims.

What I claim is:

1. A device for retarding the spread of an external fire into an aircraft cabin through a cabin window in an aircraft body wall, comprising a window area covering slide member made at least partly of fire retardant material, a guide arranged along sides of said window for guiding a movement of said slide member between a removed position and a window covering position, said guide also being made substantially of fire retardant material and an automatic release member for operating said fire retardant slide member into a fire retarding, window area covering position.

2. The device of claim 1, wherein said guide is positioned vertically alongside vertical sides of said cabin window.

3. The device of claim 1, wherein said fire retardant slide member is constructed as a layered structure of fire retardant materials.

4. The device of claim 3, wherein said layered structure of said slide member comprises two cover layers made of glass fiber reinforced phenolic resin and a central core layer made as a honeycomb structure with core elements with a hexagonal cross-section.

5. The device of claim 1, wherein said fire retardant slide member comprises a fire retardant coating.

6. The device of claim 5, wherein said fire retardant coating is an intumescent material that foams up in response to heat.

7. The device of claim 1, wherein said fire retardant guide comprises rails made of a glass fiber reinforced thermosetting material.

8. The device of claim 1, wherein said automatic release member is made of a thermoplastic material forming a locking element which normally holds said slide member in said removed position and which in response to a threshold temperature softens sufficiently to permit said slide member to move from said removed position into said window covering position.

9. The device of claim 8, wherein said threshold temperature of said thermoplastic material is within the range of about 150° C. to about 200° C. within which said locking element softens sufficiently to release said slide member.

10. The device of claim 8, wherein said thermoplastic material of said locking element is a glass fiber reinforced thermoplastic material.

11. The device of claim 1, wherein at least one section of said slide member is constructed to be elastic against bending.

12. The device of claim 1, further comprising a handle secured to said slide member for manually moving said slide member into said window covering position.

13. The device of claim 1, wherein said slide member is made of a fire retardant opaque material.

14. The device of claim 1, wherein said guide extends vertically when said aircraft body is in its normal attitude.

15. A device for retarding the spread of an external fire into an aircraft cabin through a cabin window in an aircraft body wall, comprising a window area covering slide member made at least partly of fire retardant material constructed as a layered structure, a guide arranged along sides of said window for guiding a movement of said slide member between a removed position and a window covering position, said guide also being made substantially of fire retardant material, a mechanism for operating said fire retardant slide member into a fire retarding, window area covering position, wherein said layered structure of said slide member comprises two cover layers made of glass fiber reinforced phenolic resin and a central core layer made as a honeycomb structure with core elements having a hexagonal cross-section.

16. The device of claim 15, wherein said mechanism for operating said fire retardant slide member comprises an automatic release member connected to said slide member for moving the slide member into a fire retarding window covering position.

17. The device of claim 16, wherein said automatic release member is made of a thermoplastic material forming a locking element which normally holds said slide member in said removed position and which in response to a threshold temperature softens sufficiently to permit said slide member to move from said removed position into said window covering position.

18. The device of claim 15, further comprising a handle secured to said slide member for manually moving said slide member into said window covering position.

19. The device of claim 15, further comprising a fire retardant coating on said slide member, said fire retardant coating being an intumescent material that foams up in response to heat.

20. The device of claim 15, wherein said fire retardant guide comprises rails made of a glass fiber reinforced thermosetting material.

* * * * *